(12) United States Patent
Pegg et al.

(10) Patent No.: US 9,476,450 B2
(45) Date of Patent: Oct. 25, 2016

(54) ENGINE BEARING BLOCK ASSEMBLY

(71) Applicant: Ford Global Technologies, LLC, Dearborn, MI (US)

(72) Inventors: Ian Graham Pegg, Chelmsford (GB); Robert Helle-Lorentzen, Chelmsford (GB); Nigel Philip Harold Fawcett, Greenwich (GB); Roland Paul Stark, Hitchin (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/242,736

(22) Filed: Apr. 1, 2014

(65) Prior Publication Data
US 2014/0305399 A1   Oct. 16, 2014

(30) Foreign Application Priority Data

Apr. 10, 2013   (GB) .................................. 1306506.5

(51) Int. Cl.
| | | |
|---|---|---|
| *F02B 1/10* | (2006.01) | |
| *F16C 17/12* | (2006.01) | |
| *F16C 35/02* | (2006.01) | |
| *F16C 17/24* | (2006.01) | |
| *F16C 33/10* | (2006.01) | |
| *F02F 7/00* | (2006.01) | |
| *F01M 5/00* | (2006.01) | |

(52) U.S. Cl.
CPC ............. *F16C 17/12* (2013.01); *F02F 7/0053* (2013.01); *F16C 17/243* (2013.01); *F16C 33/105* (2013.01); *F16C 35/02* (2013.01); *F01M 2005/008* (2013.01); *F16C 2202/24* (2013.01); *F16C 2206/56* (2013.01); *F16C 2360/22* (2013.01)

(58) Field of Classification Search
CPC .... F16C 9/02; F16C 33/121; F16C 2202/24; F16C 33/12; F16C 17/243; F16C 2202/20; F16C 2206/56; F16C 33/125; F16C 3/16
See application file for complete search history.

(56) References Cited

U.S. PATENT DOCUMENTS

| | | | | |
|---|---|---|---|---|
| 3,820,523 A | * | 6/1974 | Showalter et al. | ........... 123/669 |
| 4,445,471 A | * | 5/1984 | Hayashi | .................... 123/198 E |
| 4,561,634 A | * | 12/1985 | Zeilinger et al. | ............. 251/364 |
| 4,612,885 A | | 9/1986 | Yoshikawa | |
| 4,848,292 A | * | 7/1989 | Holtzberg | .................. 123/193.3 |
| 5,063,881 A | * | 11/1991 | Kawamura | .................... 123/1 A |
| 5,107,809 A | * | 4/1992 | Suh | ........................... 123/195 H |

(Continued)

FOREIGN PATENT DOCUMENTS

| | | |
|---|---|---|
| DE | 19944930 A1 | 3/2000 |
| DE | 19949928 A1 | 4/2001 |

(Continued)

*Primary Examiner* — Marguerite McMahon
*Assistant Examiner* — Tea Holbrook
(74) *Attorney, Agent, or Firm* — Greg Brown; Alleman Hall McCoy Russell & Tuttle LLP

(57) ABSTRACT

A bearing block assembly in an engine is provided. The bearing block assembly includes at least one bearing block to rotatably support an oil lubricated shaft and fastening apparatus to attach the at least one bearing block to a flat mounting surface on a large engine component and a thermal barrier positioned between the shaft and the flat mounting surface configured to reduce the loss of heat to the large engine component from oil used to lubricate the shaft.

16 Claims, 4 Drawing Sheets

(56) References Cited

U.S. PATENT DOCUMENTS

| | | | | |
|---|---|---|---|---|
| 5,269,178 | A | * | 12/1993 | Vigmostad et al. ........ 73/114.15 |
| 5,404,847 | A | * | 4/1995 | Han ...................... F02F 7/008 |
| | | | | 123/195 H |
| 5,451,749 | A | * | 9/1995 | Griebel et al. ................. 219/639 |
| 5,641,434 | A | | 6/1997 | Yamada et al. ................. 516/78 |
| 6,231,240 | B1 | * | 5/2001 | Brenker et al. ............... 384/432 |
| 6,649,325 | B1 | * | 11/2003 | Gundale et al. .............. 430/311 |
| 6,715,458 | B1 | * | 4/2004 | Tappen .................... 123/195 R |
| 6,989,617 | B1 | * | 1/2006 | Vandenbossche .......... 310/68 D |
| 8,281,762 | B2 | * | 10/2012 | Sicre et al. ................ 123/195 C |
| 2002/0020287 | A1 | * | 2/2002 | Yamauchi ........................ 92/73 |
| 2003/0029413 | A1 | * | 2/2003 | Sachdev et al. .......... 123/195 R |
| 2003/0118260 | A1 | * | 6/2003 | Suzuki ..................... F16C 9/02 |
| | | | | 384/432 |
| 2004/0000229 | A1 | * | 1/2004 | Nakamura ............ F02F 7/0053 |
| | | | | 92/140 |
| 2005/0166887 | A1 | * | 8/2005 | Markou .................... 123/195 H |
| 2007/0087217 | A1 | * | 4/2007 | Wakade ........................ 428/660 |
| 2007/0209628 | A1 | * | 9/2007 | Natkin et al. ............. 123/195 R |
| 2008/0220234 | A1 | * | 9/2008 | Ko et al. ........................ 428/220 |
| 2008/0304906 | A1 | * | 12/2008 | Maj ............................ 403/408.1 |
| 2009/0243219 | A1 | * | 10/2009 | Whitlow et al. .............. 277/306 |
| 2010/0043743 | A1 | * | 2/2010 | Maxwell ......................... 123/25 |
| 2011/0064346 | A1 | * | 3/2011 | Griggs .......................... 384/473 |
| 2011/0155090 | A1 | * | 6/2011 | Barbezat et al. ........... 123/193.2 |
| 2012/0067322 | A1 | * | 3/2012 | Andersson et al. ....... 123/198 E |
| 2013/0209784 | A1 | * | 8/2013 | Nakagawa et al. ........ 428/314.8 |
| 2013/0343683 | A1 | * | 12/2013 | Sanda et al. ................. 384/397 |

FOREIGN PATENT DOCUMENTS

| | | | | |
|---|---|---|---|---|
| DE | 102005055039 A1 | * | 5/2007 | |
| GB | 143366 | * | 5/1920 | |
| JP | 63120913 A | * | 5/1988 | |
| JP | H05149389 A | | 6/1993 | |
| JP | 06330932 A | * | 11/1994 | ............... F16C 9/02 |
| JP | H06330932 A | | 11/1994 | |
| JP | H07113367 A | | 5/1995 | |
| JP | 2010127375 A | | 6/2010 | |
| WO | 2012128097 A1 | | 9/2012 | |

* cited by examiner

ENGINE BEARING BLOCK ASSEMBLY

CROSS REFERENCE TO RELATED APPLICATIONS

The present application claims priority to G.B. Patent Application No. 1306506.5, "AN ENGINE BEARING BLOCK ASSEMBLY," filed Apr. 10, 2013, the entire contents of which are hereby incorporated by reference for all purposes.

FIELD

The present disclosure relates to bearing assemblies used to rotatably support a shaft of an engine and in particular to an improved engine bearing block assembly.

BACKGROUND AND SUMMARY

It is known in the art to provide a bearing assembly for rotating a shaft of an engine, such as for example a crankshaft main bearing assembly, a camshaft bearing assembly, and a balancer shaft bearing assembly.

Such prior art bearing assemblies may use a bearing structure in which a half bearing part of the bearing assembly is formed as an integral part of the engine component used to support the bearing assembly such as, for example, a cylinder block of the engine in the case of a crankshaft main bearing assembly or balancer shaft assembly and a cylinder head in the case of a camshaft bearing assembly. U.S. Pat. Nos. 4,612,885 and 8,281,762 show example prior art bearing assemblies.

The bearing assemblies may include a bearing cap which is fastened to the half bearing part to form in combination a rotatable support for the respective shaft. With such an arrangement the bore of each bearing assembly is machined in-situ on the engine component and then the end cap has to be removed to fit the shaft and is then refastened to the half bearing part on the engine component for use.

Such a manufacturing arrangement is complex, time consuming and requires the engine component to include intricate shapes and forms to provide the half bearings. A further problem with such an arrangement is that, due to the thermally conductive nature of such a bearing assembly, the majority of the heat transferred to oil used to lubricate the bearing assembly is lost by conduction into the very large mass constituted by the engine component. For example, in the case of a main bearing assembly, a large portion of the heat generated is lost by way of conduction to the cylinder block.

Following a start-up from cold, that is an engine start-up where the temperature of the engine is originally close to ambient temperature, significant friction losses are produced due to the lubricating oil being below an optimum operating temperature. These losses increase fuel usage during the initial warm-up period and, in addition, increase wear if the oil is below a minimum temperature at which additives in the oil become fully activated. In an effort to reduce these losses it has been proposed to insulate an oil feed passage of the engine so as to reduce the loss of heat from the oil, thereby speeding up the oil heating process and reducing fuel usage. While such an approach produces a significant reduction in oil warm-up time, the heat lost from oil within a rotating shaft bearing of such an engine is not reduced.

As such in one approach, a bearing block assembly in an engine is provided. The bearing block assembly comprises at least one bearing block to rotatably support an oil lubricated shaft and fastening apparatus to attach the at least one bearing block to a flat mounting surface on a large engine component and a thermal barrier positioned between the shaft and the flat mounting surface and configured to reduce the loss of heat to the large engine component from oil used to lubricate the shaft. In this way, heat loss from oil used to lubricate a rotatable shaft bearing assembly of an engine is reduced. Additionally, the aforementioned engine bearing assembly is simple in construction, thereby reducing the cost and complexity of manufacture of the engine component to which it is fastened.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure. Additionally, the above issues have been recognized by the inventors herein, and are not admitted to be known.

Figure 1:
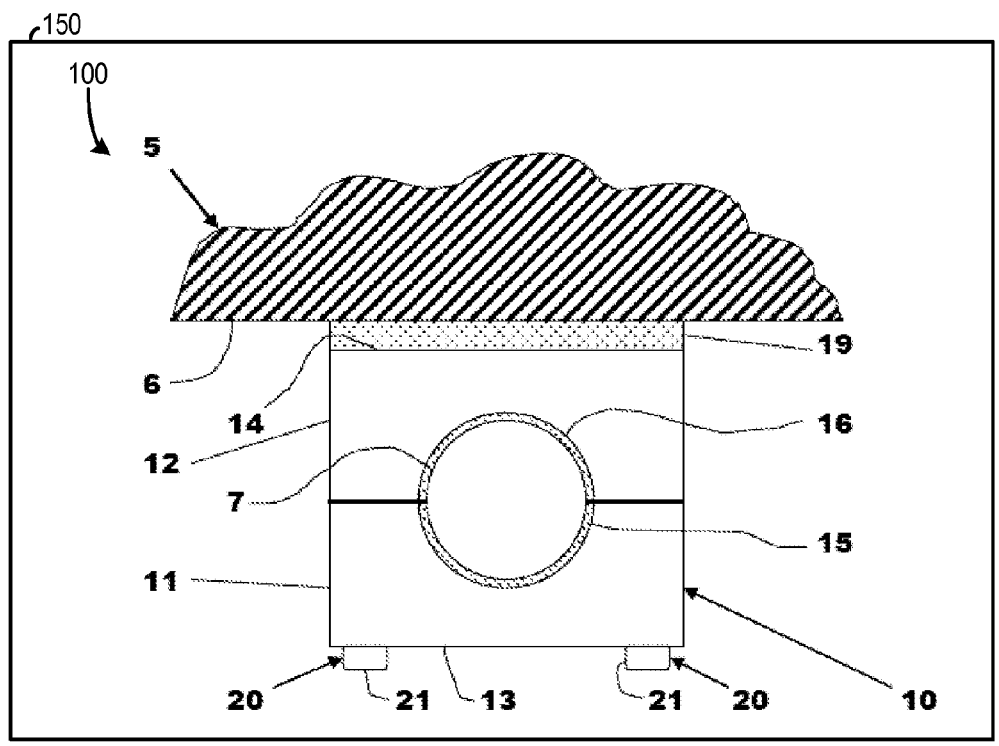
FIG. 1 is an end view of a first example bearing block assembly.

The figures are diagrammatic in nature.

DETAILED DESCRIPTION

A bearing block assembly in an engine is described herein. The bearing block assembly may include at least one bearing block to rotatably support an oil lubricated shaft and fastening apparatus to attach the at least one bearing block to a flat mounting surface on a large engine component and a thermal barrier positioned between the shaft and the flat mounting surface and configured to reduce the loss of heat to the large engine component from oil used to lubricate the shaft. In this way, heat loss from oil used to lubricate a rotatable shaft bearing assembly of an engine is reduced. Additionally, the aforementioned engine bearing assembly is simple in construction, thereby reducing the cost and complexity of manufacture of the engine component to which it is fastened.

The bearing block assembly may include first and second bearing blocks and the fastening apparatus may comprise a pair of spaced apart threaded fasteners that extend through holes in the two bearing blocks to attach the bearing blocks to the large engine component wherein the second bearing block has an end face and the thermal barrier includes a layer of insulating material interposed between the end face of the second bearing block and the flat mounting surface so that no part of the second bearing block is in contact with the flat mounting surface.

Alternatively, in another example the bearing block assembly may include a single bearing block and the fastening apparatus may comprise a pair of spaced apart threaded fasteners that extend through holes in the single bearing block to attach the bearing block to the large engine component wherein the bearing block has an end face and the thermal barrier includes a layer of insulating material interposed between the end face of the bearing block and the flat mounting surface on the large engine component so that no part of the bearing block is in contact with the flat mounting surface.

The layer of insulating material may be an insulating plate made from a material having a low thermal conductivity, in one example. Furthermore, the insulating plate may space the end face of an abutting bearing block away from the flat mounting surface so that no part of the abutting bearing block is in contact with the flat mounting surface. Additionally, the insulating material may be a ceramic material in one example.

Moreover, each threaded fastener may have an elongate shank that extends through at least one bearing block and a secondary thermal barrier is interposed between each elongate shank and the at least one bearing block through which it extends, in some examples.

The secondary thermal barrier may comprise one of a tube made from an insulating material, an air gap and a layer of insulating material on the elongate shank, in some examples. In another alternative example, the bearing block assembly may include first and second bearing blocks made from a thermal insulating material and the fastening apparatus may comprise a pair of spaced apart threaded fasteners that extend through holes in the two bearing blocks to attach the bearing blocks to the large engine component wherein the thermal barrier comprises the first and second bearing blocks.

In a further alternative example, the bearing block assembly may include a single bearing block made from a thermal insulating material and the fastening apparatus may comprise a pair of spaced apart threaded fasteners that extend through holes in the single bearing block to attach the bearing block to the large engine component wherein the thermal barrier comprises the single bearing block. In another example, each bearing block may be made from a ceramic material having a low thermal conductivity. Advantageously, each bearing block may be made from a ceramic material having a thermal coefficient of linear expansion that is less than the material from which the oil lubricated shaft is made.

In another example, an engine system having a large engine component and a plurality of bearing blocks attached to the large engine component, spaced away from one another, and rotatably supporting an oil lubricated shaft and fastening apparatus to attach the at least one bearing block to a flat mounting surface on a large engine component wherein the bearing block assembly provides a thermal barrier between the shaft and the flat mounting surface so as to reduce the loss of heat to the large engine component from oil used to lubricate the shaft.

In one example, the large engine component may have a single flat planar mounting surface to which all of the respective bearing block assemblies may be attached. Alternatively in one example, the large engine component may have a like number of flat mounting surfaces as there are bearing block assemblies and each bearing block assembly may be attached to a respective one of the flat mounting surfaces. The large engine component may be a cylinder block of an engine, a crankcase of an engine, or a cylinder head of an engine. In one example, the large engine component is an engine component that is relatively large in terms of its mass, surface area, or a combination thereof, in comparison to another smaller engine component communicating with the oil, such as a valve.

With particular reference to FIG. 1, there is shown a large engine component in the form of a cylinder block 5 of an engine 150. However, it will be appreciated that the large engine component may be a crankcase of an engine or a cylinder head of an engine, in other examples. The cylinder block 5 has a flat surface thereon forming a flat mounting surface 6 for the attachment of a bearing block assembly 10.

It will be appreciated that there could be a like number of flat mounting surfaces 6 as there are bearing block assemblies 10 or there could be a single large flat planar mounting surface to which more than one bearing assembly 10 is attached. In other words, the number of flat mounting surfaces may be equal to the number of bearing block assemblies.

In the depicted example, the bearing block assembly 10 includes a first and second metal bearing blocks 11 and 12 and a thermal barrier formed by a layer of insulating material in the form of flat insulating plate 19.

The first bearing block 11 has an end face 13 and includes a bearing surface 15 which may be integrally formed as a coating of bearing material applied to the first bearing block 11 or can be a separate bearing shell made from a bearing material. Two spaced apart holes are formed in the first bearing block 11 to allow for the passage of threaded fasteners 20.

The second bearing block 12 has a flat planar end face 14 and includes a bearing surface 16 which may be integrally formed as a coating of bearing material applied to the second bearing block 12 or can be a separate bearing shell made from a bearing material. Two spaced apart holes are formed in the second bearing block 12 to allow for the passage of the threaded fasteners 20.

The first and second bearing blocks 11 and 12 in combination rotatably support a shaft in the form of a crankshaft 7. An oil feed (not shown) is formed as part of the second bearing block 12 to supply lubricating oil to the crankshaft 7. The flat insulating plate 19 is made from a material having a very low thermal conductivity such as, for example, Silicon Carbide or another suitable ceramic material.

In the depicted example, the insulating plate 19 is interposed between the flat end face 14 of the second bearing block 12 and the flat mounting surface 6 on the cylinder block 5 such that no part of the end face 14 of the second bearing block 12 touches the flat mounting face 6 of the cylinder block 5. The insulating plate 19 has two spaced apart holes to allow for the passage of the threaded fasteners 20 and has a flat surface for abutment against the flat mounting surface 6 and a flat surface for abutment against the end face 14.

It will be appreciated that the layer of insulating material could alternatively be formed as a coating on the second bearing block 12 and need not be a separate plate like component and, in such a case, the insulating layer is arranged such that no part of the second bearing block 12 touches the flat mounting surface 6 of the cylinder block 5.

In one example, the entire end face 16 of the second bearing block 12 may be covered by the insulating layer or the insulating plate as this reduces the risk of distortion of the second bearing block 12 in use. The insulating plate 19 spaces the second bearing block 12 away from the flat mounting surface 6 so that no part of the second bearing block 12 is in contact with the flat mounting surface 6, in some examples.

Rotation of the crankshaft 7 in the bearing block assembly 10 produces friction thereby heating the oil but, due to the fact that the bearing block assembly 10 forms a thermal barrier between the oil used to lubricate the crankshaft 7 and the cylinder block 5, the loss of heat from the oil is significantly reduced thereby assisting with oil warm-up particularly following a cold start of the engine of which the cylinder block 5 forms a part.

Figure 3:
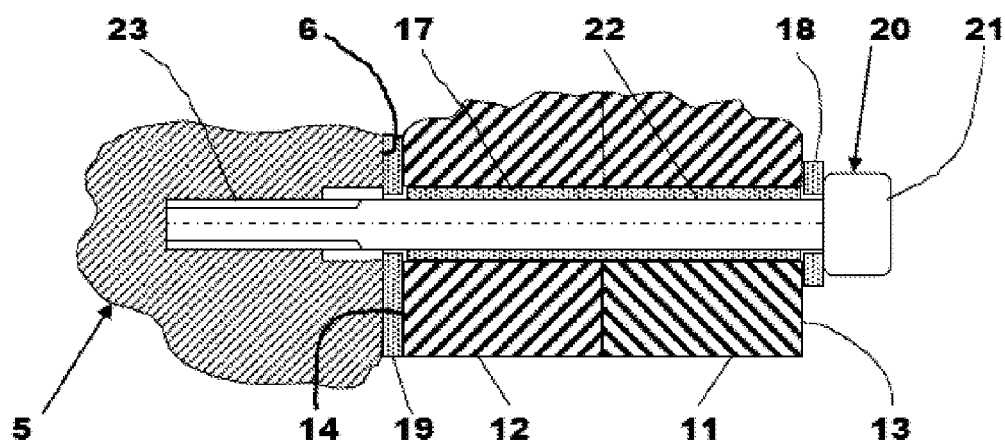
FIG. 3 is a cross-section through the bearing block assembly shown in FIG. 1 showing a first example fastener and insulation arrangement.

Referring now to FIG. 3, which shows a first example fastener and insulation arrangement. It can be seen in the depicted example that each of the threaded fasteners 20 has a head 21, an elongate shank 22 and a threaded end portion 23 that is threadingly engaged with a female thread form in the cylinder block 5. An insulating washer 18 is interposed between the head 21 of the threaded fastener 20 and the end face 13 of the first bearing block 11 and an insulating tube 17 is fitted in the holes formed in the first and second bearing blocks 11 and 12 so as to provide a thermal barrier between the shank 22 of the threaded fastener 20 and the first and second bearing blocks 11 and 12. It will be appreciated that there could, alternatively, be two insulating tubes, one fitted in the first bearing block 11 and one fitted in the second bearing block 12. It will also be appreciated that the shank 22 of the threaded fastener 20 could alternatively be coated with a thermal insulating material.

The insulating tube 17 and the insulating washer 18 are both made from a material having a low thermal conductivity such as silicon carbide and provide a thermal barrier between the first and second bearing blocks 11 and 12 and the respective threaded fastener 20.

The two threaded fasteners 20 are used to attach the bearing blocks 11, 12 to the cylinder block 5 by means of their threaded engagement with the female thread form in the cylinder block 5. It will be appreciated that the insulating plate 19 is also clamped or fastened to the cylinder block 5 by virtue of its interposed position between the flat mounting surface 6 of the cylinder block 5 and the flat end face 14 of the second bearing block 12.

Thermal barriers in the form of the insulating plate 19, the washer 18 and the insulating tube 17 are therefore interposed between the oil used to lubricate the shaft 7 and the cylinder block 5 so as to reduce the loss of heat from the oil. Therefore the heat flow path between the oil used to lubricate the crankshaft 7 and the cylinder block 5 is interrupted by interposing at least one thermal barrier between the shaft lubricated by the oil and the cylinder block 5. The use of such thermal barriers reduces the loss of heat from the oil to the large structural component, such as crankshaft 5, to which the bearing block assembly 10 is attached and thereby reduces the time required for the oil to reach a desired operating temperature.

Figure 4:
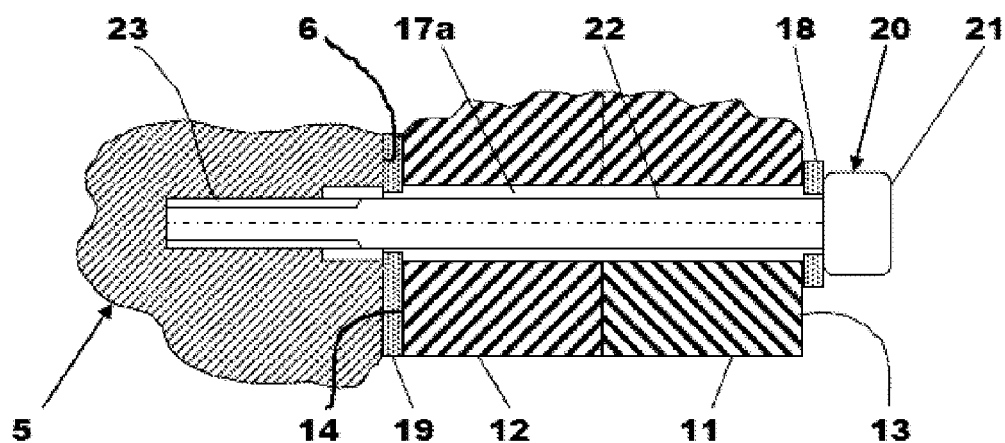
FIG. 4 is a cross-section through the bearing block assembly shown in FIG. 1 showing a second example fastener and insulation arrangement.

Referring now to FIG. 4 which shows a second example fastener and insulation arrangement that may be a direct replacement for the fastener and insulation arrangement previously described with reference to FIG. 3.

The only significant difference between this example and that previously described with reference to FIG. 3 is that the insulating tube 17 is replaced in the case of this example with an air gap 17a. As before two fasteners 20 are used to attach the bearing block assembly 10 to the cylinder block 5 and thermal barriers in the form of the insulating plate 19, the washer 18 and the air gap 17a are interposed between the oil used to lubricate the shaft 7 and the cylinder block 5.

The example shown in FIG. 4 also has the effect of interrupting the heat flow path between the oil used to lubricate the crankshaft 7 and the cylinder block 5 by interposing at least one and in this case three thermal barriers between the crankshaft lubricated by the oil and the cylinder block 5. The loss of heat from the oil to the large structural component 5 is thereby reduced and the time required for the oil to reach a desired operating temperature is also reduced.

Figure 5:
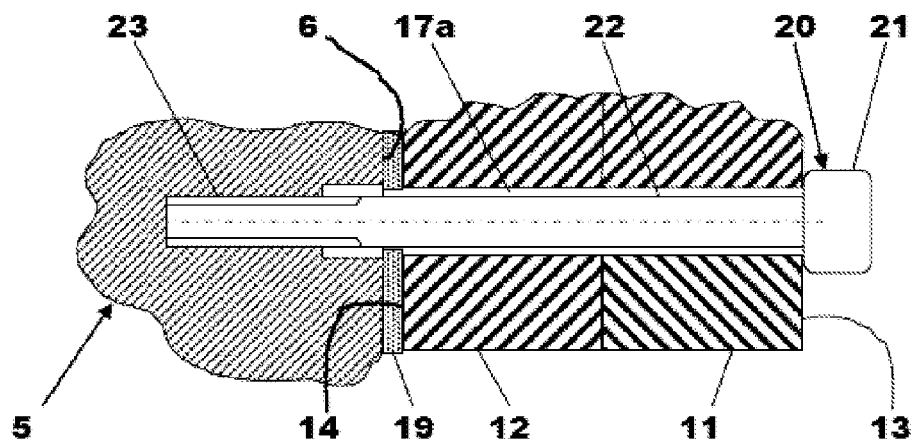
FIG. 5 is a cross-section through the bearing block assembly shown in FIG. 1 showing a third example fastener and insulation arrangement.

Referring now to FIG. 5 which shows a third example fastener and insulation arrangement that may be a direct replacement for the fastener and insulation arrangement previously described with reference to FIG. 3.

The only significant difference between this example and that previously described with reference to FIG. 4 is that there is no insulating washer between the head 21 of the threaded fastener 20 and the first bearing block 11 and this is the arrangement shown in FIG. 1.

As before, two fasteners 20 are used to attach the bearing block assembly 10 to the cylinder block 5 and thermal barriers in the form of the insulating plate 19 and the air gap 17a are interposed in heat flow paths between the oil used to lubricate the shaft 7 and the cylinder block 5. However, with this example a heat flow path through the head 21 of the threaded fastener 20 remains. However, this heat flow path is relatively small due to the very small contact area between the head 21 of the threaded fastener 20 and the first bearing block 11.

The example in FIG. 5 also has the effect of interrupting the heat flow path between the oil used to lubricate the crankshaft 7 and the cylinder block 5 by interposing thermal barriers between the crankshaft lubricated by the oil and the cylinder block 5. As before, the loss of heat from the oil to the large structural component (crankshaft 5) is thereby reduced and the time required for the oil to reach a desired operating temperature is also reduced.

The examples shown in FIGS. 3 and 4 may be used instead of the example shown in FIG. 5 in the bearing block assembly shown in FIG. 1 because secondary thermal barriers are in position between the threaded fastener 20 and the bearing blocks 11, 12. Therefore no contact between the threaded fastener 20 and the bearing blocks 11, 12 is possible with these examples.

Although the bearing block assembly has been described by way of example with reference to the use of a bearing block assembly to rotatably support a crankshaft and attach the crankshaft to a cylinder block of an engine it will be appreciated that the shaft could be any shaft of an engine that requires oil lubrication and the large structural component could be the component to which that bearing block assembly is connected.

For example, the shaft could be a camshaft and the large structural component could be a cylinder head alternatively, the shaft could be a balancer shaft and the large structural component could be a cylinder block or a crankcase.

One advantage of the bearing block assembly described herein is that the components used to form the bearing block assembly are of simple shape and construction. A further advantage of the bearing block assembly described herein is that the large structural component does not have to be specially shaped to fit the bearing block assembly it is only necessary to provide a flat planar surface or flat surfaces to which the bearing assemblies are attached.

It will be appreciated that several bearing block assemblies may be needed to support a single shaft and that the flat surface or flat surfaces on the large structural component have to be correctly aligned to correctly position the shaft. However, the machining of such aligned flat surfaces or a single flat surface is more easily performed, can be produced with a high degree of accuracy and is potentially less expensive to produce than is the case with a prior art arrangement in which one part of the bearing block assembly is formed as an integral part of the large structural component.

A method for producing a big end bearing using a cracking and coating process is disclosed in U.S. Pat. No. 6,379,754 and similar techniques could be used to produce the first and second bearing blocks 11, 12, if desired. However, other suitable manufacturing techniques have been contemplated.

Figure 2:
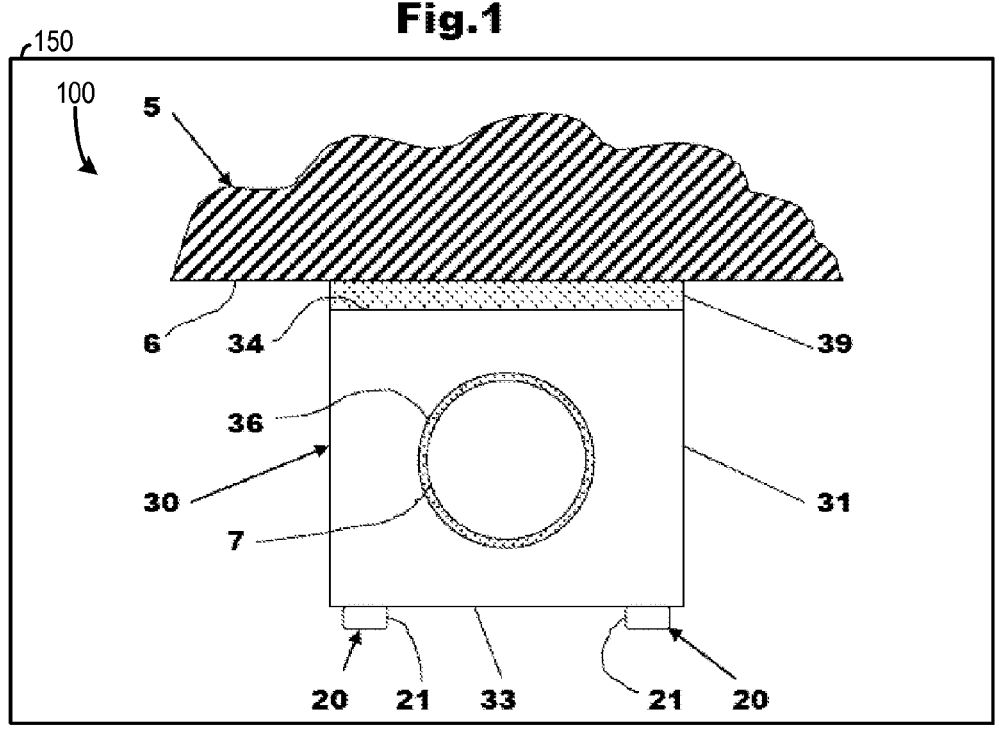
FIG. 2 is an end view of a second example bearing block assembly.

Referring now to FIG. 2 there is shown a second example of a bearing block assembly 30 that may be a direct replacement for the bearing block assembly 10 shown and described with respect to FIG. 1. As before, a large engine component in the form of a cylinder block 5 of an engine 150 has a flat mounting surface 6 thereon for the attachment of the bearing block assembly 30.

As before, there could be a like number of flat mounting surfaces 6 as there are bearing block assemblies 30 or there could be a single large flat planar mounting surface to which more than one bearing assembly 30 is attached. In other words, the number of flat mounting surfaces 6 may be the same as the number of bearing block assemblies.

The bearing block assembly 30 includes single metal bearing block 31 and a thermal barrier formed by a layer of insulating material in the form of a flat insulating plate 39. However, other bearing block assembly configurations have been contemplated.

In the depicted example, the bearing block 31 has first and second end faces 33 and 34 and includes a bearing surface 36. Furthermore, the bearing surface 36 is in the form of a separate bearing shell made from a bearing material. Two spaced apart holes are formed in the bearing block 31 to allow for the passage of threaded fasteners 20.

The threaded fasteners 20 and the insulation of these fasteners 20 from the bearing block 31 is similar to that previously described with reference to FIGS. 3-5 with the exception that, in the case of this example, there is only a single bearing block 31. As before, the examples shown in FIGS. 3 and 4 may be used in the bearing block assembly shown in FIG. 2 instead of the example shown in FIG. 5. This is because there are secondary thermal barriers in position between the threaded fastener 20 and the bearing block 31 with these examples. Therefore, no contact between the threaded fastener 20 and the bearing block 31 is possible in the examples shown in FIGS. 3 and 4.

As before, the bearing block 31 rotatably supports a shaft in the form of the crankshaft 7 and an oil feed (not shown) is formed as part of the bearing block 31 to supply lubricating oil to the crankshaft 7.

The flat insulating plate 39 may be made from a material having a very low thermal conductivity such as, for example, Silicon Carbide or another suitable ceramic material. The insulating plate 39 is interposed between the flat second end face 34 of the bearing block 31 and the flat mounting surface 6 on the cylinder block 5 such that no part of the bearing block 31 touches the flat mounting surface 6 of the cylinder block 5, in the depicted example.

The insulating plate 39 has two spaced apart holes to allow for the passage of the threaded fasteners 20. The insulating plate 39 has a flat surface for abutment against the flat mounting surface 6 and a flat surface for abutment against the end face 34.

It will be appreciated that the insulating layer may alternatively be formed as a coating on the bearing block 31 and need not be a separate component. In such a case, the insulating layer is arranged such that no part of the bearing block 31 touches the flat mounting surface 6 of the cylinder block 5.

In one example, the end face 34 of the bearing block 31 is covered by the insulating layer or the insulating plate 39 to reduce the risk of distortion of the second bearing block 12 in use. The insulating plate 39 spaces the bearing block 31 away from the flat mounting surface 6 so that no part of the bearing block 31 is in contact with the flat mounting surface 6.

The insulating plate 39 therefore reduces heat transfer from the bearing block 31 to the cylinder block 5 thereby maintaining the oil warmer than it would otherwise be, particularly, if the cylinder block 5 is at or close to ambient temperature and the ambient temperature is low. It will be appreciated that some heat will be lost from the oil to the bearing block 31 but this may be negligible compared to the heat that would be lost to the cylinder block 5 if the bearing block 31 were to be in direct contact with the cylinder block 5.

Rotation of the crankshaft 7 in the bearing block 31 produces friction thereby heating the oil but, due to the fact that the bearing block assembly 30 forms a thermal barrier between the oil used to lubricate the crankshaft 7 and the cylinder block 5. The loss of heat from the oil is therefore significantly reduced thereby assisting with oil warm-up following a cold start of the engine of which the cylinder block 5 forms a part.

It will be appreciated that with such a one piece bearing block construction the respective shaft will need to designed so as to enable it to be fitted to the bearing block assemblies used to support it. That is to say, a fabricated or multi-piece shaft may be desired.

Figure 6:
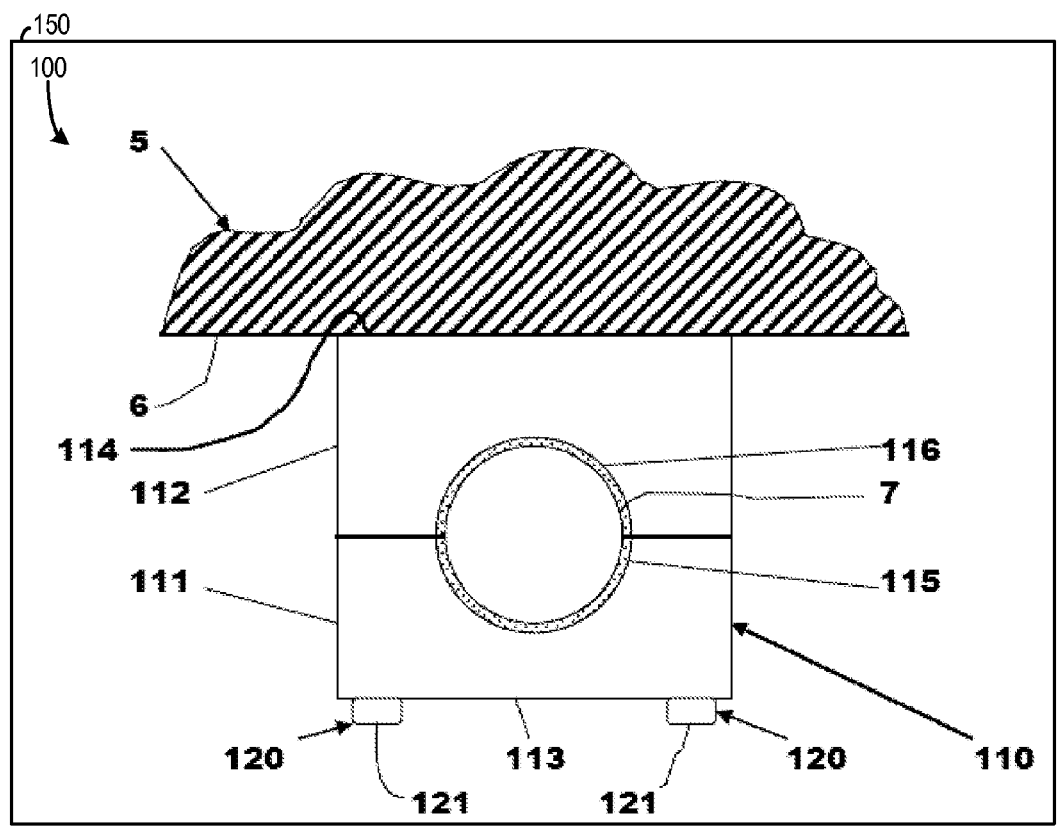
FIG. 6 is an end view of a third example bearing block assembly.

With particular reference to FIG. 6 there is shown a third example bearing block assembly 110 that may be a direct replacement for the bearing block assembly 10 shown in FIG. 1. The bearing block assembly 110 and engine 150 are illustrated. As before, an engine component in the form of a cylinder block 5 has a flat mounting surface 6 thereon for the attachment of the bearing block assembly 110. It will be appreciated that there could be a like number of flat mounting surfaces 6 as there are bearing block assemblies 110 or there could be a single large flat planar mounting surface to which more than one bearing assembly 110 is attached.

The bearing block assembly 110 may include first and second insulating bearing blocks 111 and 112. The first bearing block 111 has an end face 13 and includes a bearing surface 115 which may be integrally formed as a coating of bearing material applied to the first bearing block 111 or can be a separate bearing shell made from a bearing material. Two spaced apart holes are formed in the first bearing block 111 to allow for the passage of threaded fasteners 120.

The second bearing block 112 has a flat planar end face 114 and includes a bearing surface 116 which may be integrally formed as a coating of bearing material applied to the second bearing block 112 or can be a separate bearing shell made from a bearing material. Two spaced apart holes are formed in the second bearing block 112 to allow for the passage of the threaded fasteners 20.

The first and second bearing blocks 111 and 112 in combination rotatably support a shaft in the form of the crankshaft 7 and an oil feed (not shown) is formed as part of the second bearing block 112 to supply lubricating oil to the crankshaft 7.

The first and second bearing blocks 111 and 112 are made from a material having a very low thermal conductivity such as, for example, Silicon Carbide or another suitable ceramic material.

The flat end face 114 of the second bearing block 112 forms a flat surface that abuts directly against the flat surface 6 on the cylinder block 5, in the depicted example. The first and second bearing blocks 111 and 112 provide a large thermal barrier between the oil and the cylinder block 5.

Rotation of the crankshaft 7 in the bearing block assembly 110 produces friction thereby heating the oil but, due to the fact that the bearing block assembly 110 forms a thermal barrier between the oil used to lubricate the crankshaft 7 and the cylinder block 5. The loss of heat from the oil is therefore significantly reduced thereby assisting with oil warm-up particularly following a cold start of the engine of which the cylinder block 5 forms a part.

Figure 7:
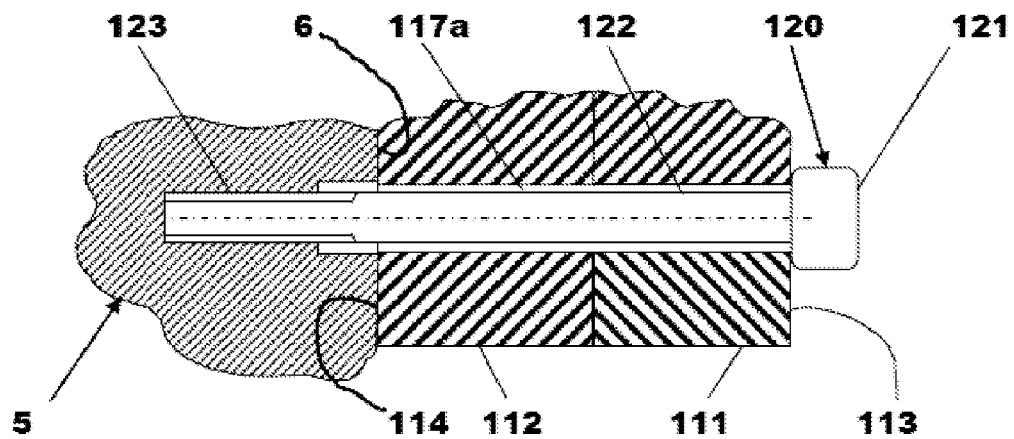
FIG. 7 is a cross-section through the bearing block assembly shown in FIG. 6 showing a fastener and insulation arrangement.

FIG. 7 shows a fastener and insulation arrangement forming part of the bearing block assembly 110. Two threaded fasteners 120 are used and each of the threaded fasteners 120 has a head 121, an elongate shank 122 and a threaded end portion 123 that is threadingly engaged with a female thread form in the cylinder block 5. The head 121 of the threaded fastener 120 reacts directly against the end face 113 of the first bearing block 111.

An air gap 117a is formed in this case between the shank 122 of the threaded fastener 120 and the holes formed in the first and second bearing blocks 111 and 112 so as to provide a thermal barrier between the shank 122 of the threaded fastener 120 and the first and second bearing blocks 111 and 112. However, the holes may be sufficient diameter to permit free passage of the threaded fastener shank 122 because very little heat is transferred from the bearing blocks 111, 112 to the shank 122 of the threaded fastener 120 due to their good heat insulating properties.

The two threaded fasteners 120 are used to attach the bearing blocks 111, 112 to the cylinder block 5 by means of their threaded engagement with the female thread for in the cylinder block 5. A thermal barrier in the form of the insulating first and second bearing blocks 111 and 112 is therefore produced between the oil used to lubricate the shaft 7 and the cylinder block 5. Therefore, because both of the bearing blocks 111, 112 are made from an insulating material, the transfer of heat from the oil lubricating the shaft 7 to the cylinder block is greatly reduced thereby assisting with warm-up of the oil.

The use of a ceramic insulating material for the bearing blocks 111, 112 is a particularly effective means of preventing heat transfer from the oil used to lubricate the shaft to the cylinder block 5. In addition, because the thermal coefficient of expansion of the ceramic bearing blocks 111, 112 is considerably less than that of the material used to manufacture the crankshaft 7 (steel or cast iron), other advantageous effects are obtained.

For example, it is advantageous if the clearance between the crankshaft 7 and the bearing blocks 111, 112 is larger when the components are in a cold state such as ambient temperature because this will produce lower friction than if a smaller clearance is used thereby reducing fuel usage. However at high temperatures a small bearing clearance may be used to reduce the flow of oil through the bearing.

If metal bearing blocks are used a large clearance cannot normally be used when the components are in a cold state such as ambient temperature because the expansion rates of the crankshaft and the bearing blocks will be very similar and so the large clearance would remain even when the oil is hot. Such a large clearance between the shaft and the bearing blocks when the oil is hot will result in excessive oil flow through the bearing thereby requiring the use of a larger oil pump or the need to run the oil pump at a higher level. In either case more fuel will need to be used to pump the oil to the shaft.

However, if a ceramic material is used for the bearing blocks 11, 112 it is possible to use a large clearance between the crankshaft 7 and the bearing material 116 when the crankshaft 7 and the bearing block assembly 110 are cold that reduces the likelihood (e.g., prevents) excessive friction in the bearing. This is because such ceramic material has a much lower coefficient of linear thermal expansion that that of the material used to make the crankshaft 7. Therefore, when the components heat up, the large clearance between the crankshaft 7 and the bearing material 116 will reduce due to differential expansion so as to produce a smaller clearance. Therefore, when the oil is hot and less viscous, the bearing clearance is less thereby preventing excessive oil loss from the bearing without any significant increase in friction.

Figure 8:
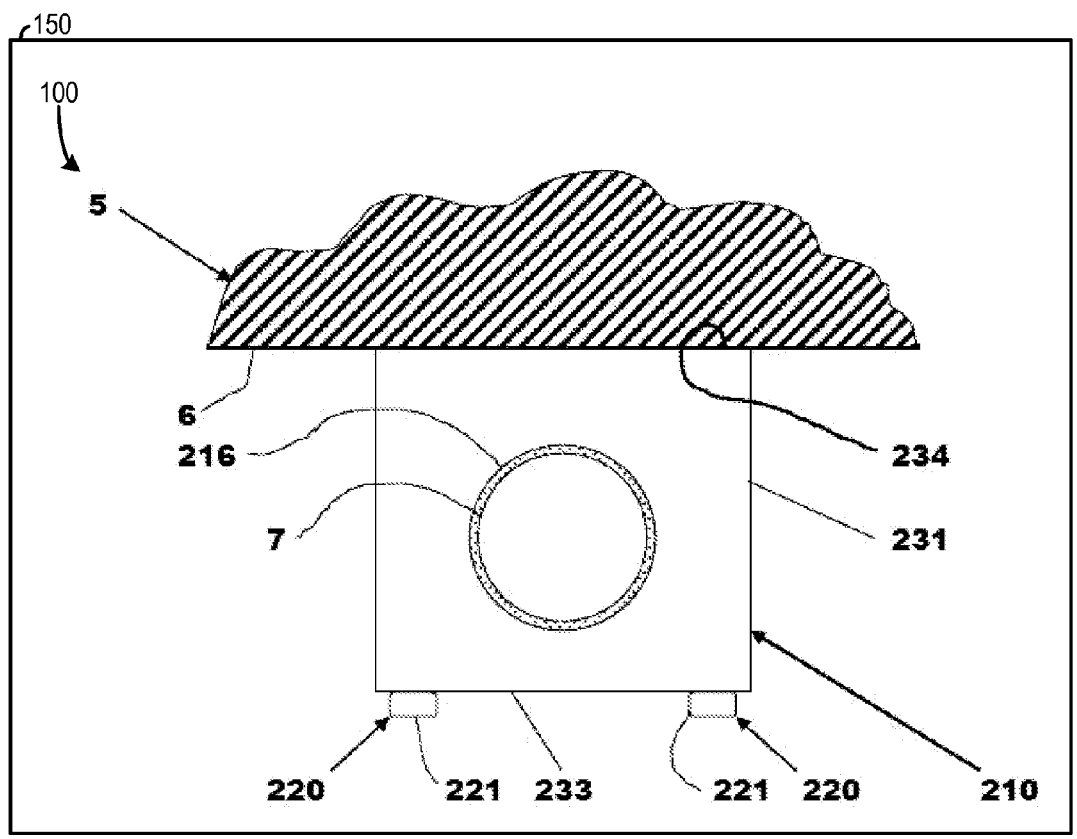
FIG. 8 is an end view of a fourth example bearing block.

Referring now to FIG. 8 there is shown a fourth example bearing block assembly 210 that may be a direct replacement for the bearing block assembly 10 shown and described with respect to FIG. 1. As before, an engine component 5 in the form of a cylinder block 5 of an engine has a flat planar surface 6 thereon for the attachment of the bearing block assembly 210.

As before, there could be a like number of flat surfaces 6 as there are bearing block assemblies 210 or there could be a large flat planar surface to which more than one bearing assembly 210 is attached.

The bearing block assembly 210 includes a single insulating bearing block 231 and two threaded fasteners 220, in the depicted example. However, other assembly configurations have been contemplated.

The bearing block 231 has a first end face 233, a second end face 234 and includes a bearing surface 216. The bearing surface 216 is in the form of a separate bearing shell made from a bearing material. Two spaced apart holes are formed to the bearing block 231 to allow for the passage of the threaded fasteners 220.

Figure 9:
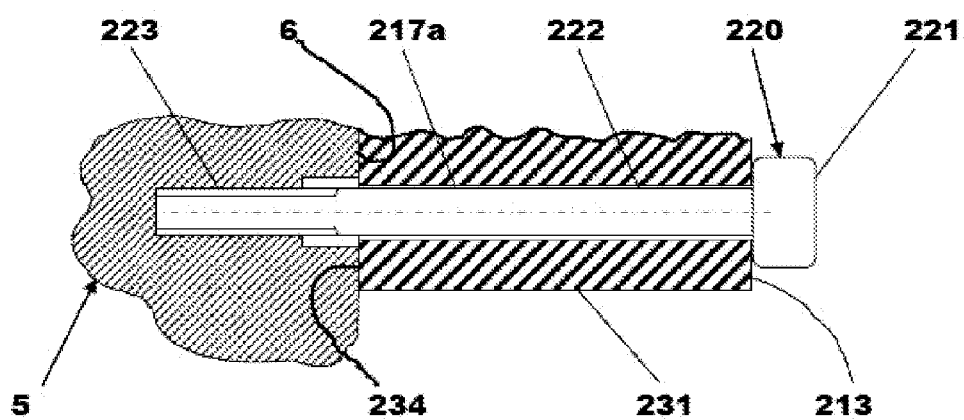
FIG. 9 is a cross-section through the bearing block assembly shown in FIG. 8 showing a fastener and insulation arrangement.

The threaded fasteners 220 and the insulation of these fasteners 220 from the bearing block 231 is shown in FIG. 9 but is similar to that previously described with reference to FIG. 7 with the exception that, in this case, there is only a single insulating bearing block 231.

Two spaced apart threaded fasteners 220 are used and each of the threaded fasteners 220 has a head 221, an elongate shank 222 and a threaded end portion 223 that is threadingly engaged with a female thread form in the cylinder block 5. The head 221 of the threaded fastener 220 reacts directly against the end face 213 of the bearing block 231.

An air gap 217a is formed between the shank 222 of the threaded fastener 220 and the holes formed in the bearing block 231 so as to provide a thermal barrier between the shank 222 of the threaded fastener 220 and the bearing block 231.

The bearing block 231 is made from a material having a very low thermal conductivity such as, for example, Silicon Carbide or other suitable ceramic materials. It is also advantageous if the material used to form the bearing block 231 has a lower coefficient of linear expansion than the material from which a shaft rotatably supported by the bearing block 231 is made. This because differential expansion can then be used as previously described to vary the clearance between the crankshaft 7 and the bearing material 216 as the temperature varies. The clearance is large when the components are at or close to ambient temperature and small when the components are at their normal operating temperatures.

The bearing block 231 rotatably supports a crankshaft 7 and an oil feed (not shown) is formed as part of the bearing block 231 to supply lubricating oil to the crankshaft 7. Additionally, the flat second end face 234 of the bearing block 231 forms a flat surface that abuts directly against the flat support surface 6 on the cylinder block 5.

It will be appreciated that some heat will be lost from the oil to the bearing block 231 but this heat loss is minimal compared to the heat that is lost to the cylinder block 5 if the bearing block is made from a thermally conductive material and is in direct contact with the cylinder block 5.

Rotation of the crankshaft 7 in the bearing block 231 produces friction thereby heating the oil but, due to the fact that the bearing block assembly 210 forms a thermal barrier between the oil used to lubricate the crankshaft 7 and the cylinder block 5, the loss of heat from the oil is significantly reduced thereby assisting with oil warm-up particularly following a cold start of the engine of which the cylinder block 5 forms a part.

The use of a ceramic insulating material for the bearing block 231 is a particularly effective means of preventing heat transfer from the oil used to lubricate the shaft to the cylinder block 5.

In addition, as previously described, because the thermal coefficient of expansion of the ceramic bearing block 231 is considerably less than that of the material used to manufacture the crankshaft 7 (steel or cast iron), other advantageous friction and oil flow effects can be obtained.

It will be appreciated that large engine component such as a cylinder block of an engine or a cylinder head of an engine may need a number of bearing block assemblies of the type previously described attached thereto in a spaced apart relationship for supporting a rotatable shaft such as for example a crankshaft, balancer shaft or camshaft.

In one example, the large engine component 5 has a single flat planar mounting surface 6 to which all of the respective bearing block assemblies 10, 30, 110, 210 are attached. In an alternative example, the large engine component 5 has a like number of flat mounting surfaces 6 as there are bearing block assemblies 10, 30, 110, 210 and each bearing block assembly 10, 30, 110, 210 is attached to a respective one of the flat mounting surfaces 6.

It will be appreciated that the four bearing block assembly examples described above are of a very simple construction and are all attached to a flat surface formed on the large structural component thereby reducing both the time and cost of manufacture of both the bearing block assemblies and the large engine component to which they are attached.

Therefore in summary, an engine bearing block assemblies provides reduced heat lost from oil used to lubricate a shaft supported by the bearing assembly thereby assisting with warm-up of the oil particularly following an engine start-up from cold and reducing fuel usage.

In two particularly advantageous examples, the bearing blocks or bearing block may be formed from an insulating material having a lower coefficient of linear expansion that the supported shaft. This permits the use of a temperature variable clearance strategy for the bearing formed by the shaft and the bearing block assembly in which a larger than normal clearance is used when the shaft and the bearing block assembly are at ambient temperature thereby reducing friction and fuel usage when the oil is cold. Differential expansion reduces the clearance when the shaft and the bearing block assembly are at their normal working temperature to reduce oil flow through the bearing.

It will be appreciated that location means such as, for example and without limitation, dowel pins will in practice be provided to provide the correct positioning of each bearing block assembly on the large engine component to which it is attached.

It will be appreciated by those skilled in the art that although the invention has been described by way of example with reference to one or more embodiments it is not limited to the disclosed embodiments and that alternative embodiments could be constructed without departing from the scope of the invention as defined by the appended claims.

Additionally, one of the bearing block assemblies 10, 30, 110, 210, shown in FIGS. 1, 2, 6, and 8, as well as the large engine component 5, shown in FIGS. FIGS. 1, 2, 6, and 8, may be included in an engine system 100, in one example.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the examples described herein, but is provided for ease of illustration and description. One or more of the illustrated actions, operations and/or functions may be repeatedly performed depending on the particular strategy being used.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A bearing block assembly in an engine comprising:
a first and a second bearing block that fully surround and rotatably support an oil lubricated shaft and a fastening apparatus to attach the first and second bearing blocks to a flat mounting surface on a large engine component;
wherein the bearing block assembly includes a flat layer of insulating material positioned between an end face of the second bearing block and the flat mounting surface, wherein the second bearing block is between the oil lubricated shaft and the flat layer of insulating material, and wherein the flat layer of insulating material is positioned so that no part of the end face of the second bearing block is in contact with the flat mounting surface, the flat layer of insulating material configured to reduce a loss of heat to the large engine component from oil used to lubricate the shaft.

2. The bearing block assembly of claim 1, wherein the fastening apparatus comprises a pair of spaced apart threaded fasteners that extend through holes in the two bearing blocks to attach the bearing blocks to the large engine component, and where the first bearing block is an upper block and where the end face is an upper end of the first bearing block that is flat and adjacent to the flat layer, and wherein the large engine component's flat mounting surface is also adjacent the flat layer opposite the upper end of the first bearing block.

3. The bearing block assembly of claim 2, where the flat layer of insulating material is a flat insulating plate made from a ceramic material having a low thermal conductivity, and wherein ends of the flat plate align with sides of the first and second bearing blocks.

4. The bearing block assembly of claim 3, where each threaded fastener has an elongate shank that extends through at least one of the first and second bearing blocks and a secondary thermal barrier is interposed between each elongate shank and the bearing block through which it extends, and where the secondary thermal barrier comprises one of a tube made from an insulating material, an air gap and a layer of insulating material on the elongate shank.

5. The bearing block assembly of claim 2, where the flat layer of insulating material is an insulating plate made from a ceramic material having a low thermal conductivity.

6. The bearing block assembly of claim 5, where the insulating material is Silicon Carbide.

7. A bearing block assembly in an engine comprising:
at least one bearing block fully surrounding and rotatably supporting an oil lubricated shaft;
a fastening apparatus to attach the at least one bearing block to a flat mounting surface on a large engine component; and
a flat layer of insulating material positioned between a flat end face of the at least one bearing block and the flat mounting surface of the large engine component, wherein the at least one bearing block is between the oil lubricated shaft and the flat layer of insulating material.

8. The bearing block assembly of claim 7, wherein the at least one bearing block includes only a single bearing block and the fastening apparatus comprises a pair of spaced apart threaded fasteners that extend through holes in the single bearing block to attach the single bearing block to the large engine component.

9. The bearing block assembly of claim 7, where the flat layer of insulating material is made from Silicon Carbide.

10. The bearing block assembly of claim 7, where the flat layer of insulating material is formed as an insulating plate.

11. The bearing block assembly of claim 7, where the large engine component is an engine block that has an equal number of flat mounting surfaces as bearing block assemblies of a system, each bearing block assembly attached to a respective flat mounting surface.

12. The bearing block assembly of claim 7, where the large engine component is a cylinder block of an engine, a crankcase of an engine, or a cylinder head of an engine.

13. A system comprising:
an engine bearing block assembly with a first and a second bearing block that fully surround and rotatably support an oil lubricated shaft;
a fastening apparatus to attach the first and second bearing blocks to a flat mounting surface on an engine block; and
a flat thermal barrier between a flat end face of the second bearing block and the flat mounting surface on the engine block, the second bearing block between the oil lubricated shaft and the flat thermal barrier, and the flat thermal barrier abutting directly against the flat mounting surface to block heat transfer to the engine block from oil lubricating the shaft.

14. The system of claim 13, wherein the flat thermal barrier is formed as an insulating plate made from Silicon Carbide.

15. The system of claim 13, where the engine block has only a single flat planar mounting surface to which all bearing block assemblies are attached.

16. The system of claim 13, wherein the flat thermal barrier is formed as an insulating plate, the insulating plate made from a ceramic material having a low thermal conductivity.

* * * * *